(12) United States Patent
Li et al.

(10) Patent No.: US 8,079,217 B2
(45) Date of Patent: Dec. 20, 2011

(54) TURBOCHARGER WITH VARIABLE TURBINE NOZZLE ACTUATED BY HYDRAULIC AND MECHANICAL SPRING FORCES

(75) Inventors: Laurent Li, Shanghai (CN); Charles Li, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 569 days.

(21) Appl. No.: 12/276,701

(22) Filed: Nov. 24, 2008

(65) Prior Publication Data

US 2010/0126168 A1    May 27, 2010

(51) Int. Cl.
*F02D 23/00* (2006.01)
(52) U.S. Cl. ............. 60/602; 415/163; 415/164
(58) Field of Classification Search ............ 60/602; 415/159, 163, 164
See application file for complete search history.

(56) References Cited

U.S. PATENT DOCUMENTS

| 3,270,951 | A  | * | 9/1966 | Reed | 60/602 |
| 6,269,642 | B1 | * | 8/2001 | Arnold et al. | 60/602 |

* cited by examiner

*Primary Examiner* — Quyen Leung
*Assistant Examiner* — Leda Pham
(74) *Attorney, Agent, or Firm* — Alston & Bird LLP

(57) ABSTRACT

A turbocharger having a variable turbine nozzle that includes an array of vanes whose setting angle is adjustable by rotation of a crank shaft coupled with a unison ring that pivots the vanes. The crank shaft is rotated by an actuation system made up of a piston contained in a bore formed in the center housing, and a hydraulic system for supplying pressurized hydraulic fluid to the bore selectively on one side or an opposite side of the piston for causing the piston to move in one direction or the other. The piston is connected to the crank shaft by a mechanical linkage that converts reciprocating movement of the piston to rotational movement of the crank shaft. A spring is arranged between the piston and a surface of the bore and continuously exerts a spring force on the piston toward the fully open position of the piston.

7 Claims, 6 Drawing Sheets

TURBOCHARGER WITH VARIABLE TURBINE NOZZLE ACTUATED BY HYDRAULIC AND MECHANICAL SPRING FORCES

BACKGROUND OF THE INVENTION

The present disclosure relates to exhaust gas-driven turbochargers having a variable turbine nozzle comprising an array of vanes that are adjustable in setting angle by rotation of a unison ring linked to the vanes, the unison ring being rotated by an actuation system that includes a hydraulic actuator comprising a piston reciprocatingly movable in a bore.

A variable-geometry turbocharger of the type indicated above is described in U.S. Pat. No. 6,269,642, which is commonly owned with the present application, and the entire disclosure of which is incorporated herein by reference. The bore for the hydraulic actuator piston is formed in an integral part of the center housing. Pressurized hydraulic fluid (engine oil) is supplied to the bore by a four-way hydraulic actuator control valve also disposed in the center housing. A solenoid is employed for moving the stem of the four-way control valve.

The variable-geometry turbocharger described in the '642 patent achieved a reduction in complexity and parts count, as well as increased reliability and reduced manufacturing costs, relative to prior turbochargers having other variable-vane systems. While the turbocharger of the '642 patent represents an advance over the prior turbochargers, further improvement is sought.

BRIEF SUMMARY OF THE DISCLOSURE

In particular, one area in which improvement is desired has to do with controlling the variable vanes during an engine start. At "key-on" when the engine is cranked by the starter, the engine oil pressure is very low, and for practical purposes is substantially zero (gage). Because there is essentially no oil pressure at key-on, the hydraulic actuator for the vanes is inoperable for controlling the position of the vanes. Consequently, there is no way for effectively ensuring that the vanes are in an optimal position for engine starting. If the vanes are in a too-closed position, undesirable consequences (e.g., turbine over-speed) can ensue. The present disclosure concerns an improvement that can effectively control vane position at key-on.

In accordance with one aspect, the present disclosure describes a turbocharger having a variable turbine nozzle that includes an array of vanes disposed in the nozzle, each vane being pivotable about a pivot axis of the vane, the vanes being connected to a rotatable unison ring such that rotation of the unison ring causes the vanes to be adjusted in setting angle. A rotatable crank shaft is coupled to the unison ring such that rotational movement of the crank shaft causes rotation of the unison ring. The crank is rotated by an actuation system comprising:

a piston contained in a bore formed in the center housing and reciprocatingly movable in the bore between a fully closed position, a fully open position, and intermediate positions therebetween, the piston including a piston rod;

a hydraulic system including hydraulic fluid passages connected to the bore, for supplying pressurized hydraulic fluid to the bore selectively on one side or an opposite side of the piston for causing the piston to move toward the fully open position or toward the fully closed position, respectively, movement of the piston toward the fully open position corresponding to pivoting of the vanes in a predetermined direction;

a mechanical linkage coupling the piston rod to the crank shaft and operable to convert reciprocating movement of the piston to rotational movement of the crank shaft; and a spring arranged between the piston and a surface of the bore, the spring being structured and arranged to continuously exert a spring force on the piston toward the fully open position of the piston.

In one embodiment, the spring has a spring constant and a configuration that are selected to ensure that the spring force is sufficient to hold the piston in a predetermined position corresponding to a predetermined position of the vanes during a start-up of the engine when the hydraulic fluid is substantially unpressurized such that hydraulic fluid force on the piston is substantially zero.

The actuation system in accordance with the present disclosure is able to hold a predetermined vane position (within an acceptable tolerance) during engine start so that undesirable consequences, such as turbine over-speed, can be avoided. More particularly, the spring force is sufficient to move the piston toward the fully open position so that the vanes will not be in a too-closed position at engine start.

The mechanical linkage in one embodiment comprises a rack gear disposed on the piston rod and a pinion secured to the crank shaft. The pinion meshes with the rack gear to convert reciprocating movement of the piston to rotational movement of the pinion and hence the crank shaft.

In one embodiment, the predetermined position of the piston is intermediate the fully open and fully closed positions. This is accomplished by selecting the spring such that in the predetermined position of the piston the spring force is substantially equal and opposite to a total gear train force that must be overcome in order to move the piston from the predetermined position farther toward the fully open position. The spring force and gear train force thus balance each other at the intermediate position of the piston.

In addition to the advantage that the vanes are positioned in a more-optimal position at engine start, the turbocharger in accordance with the present development also can benefit overall turbocharger packaging by enabling the piston diameter to be reduced. The sizing of the piston diameter tends to be driven by the need to prevent the vanes from becoming "stuck" in a too-closed position. In prior turbochargers, vane sticking was avoided by making the piston diameter larger so that the hydraulic force for a given oil pressure would be greater and would overcome the vane gear train force tending to hold the vanes in one position. In some cases, the vanes are also designed so that gas loads on the vanes are in a direction tending to close the vanes. Thus, to move the vanes toward the open position, the hydraulic actuator must overcome both the gas loads and the gear train force attributable to other causes. In accordance with the current development, however, the spring force assists the hydraulic force in opening the vanes, and hence oversizing of the piston is not necessary.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
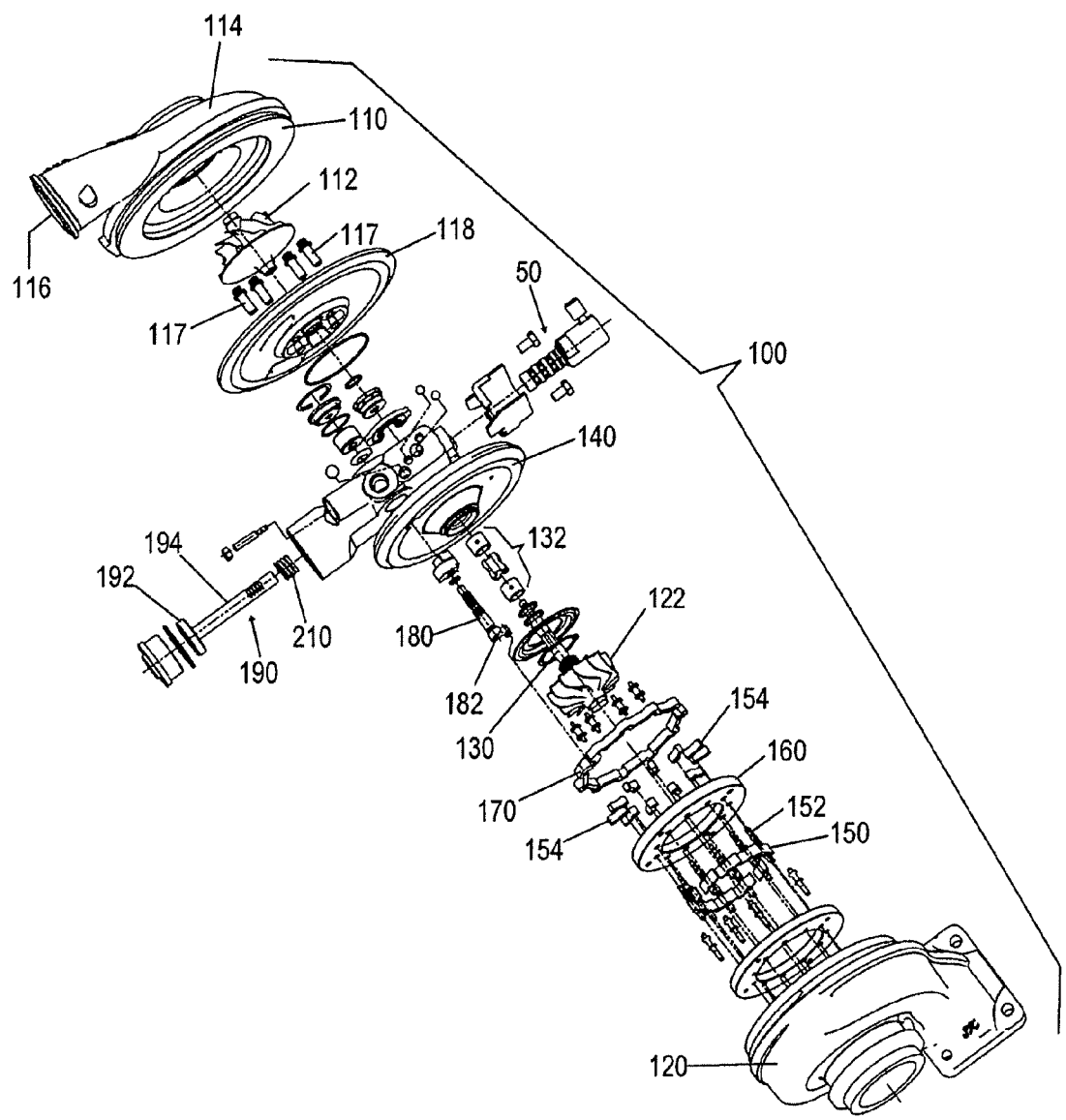
FIG. 1 is an exploded view of a turbocharger in accordance with one embodiment of the invention.
Figure 2:
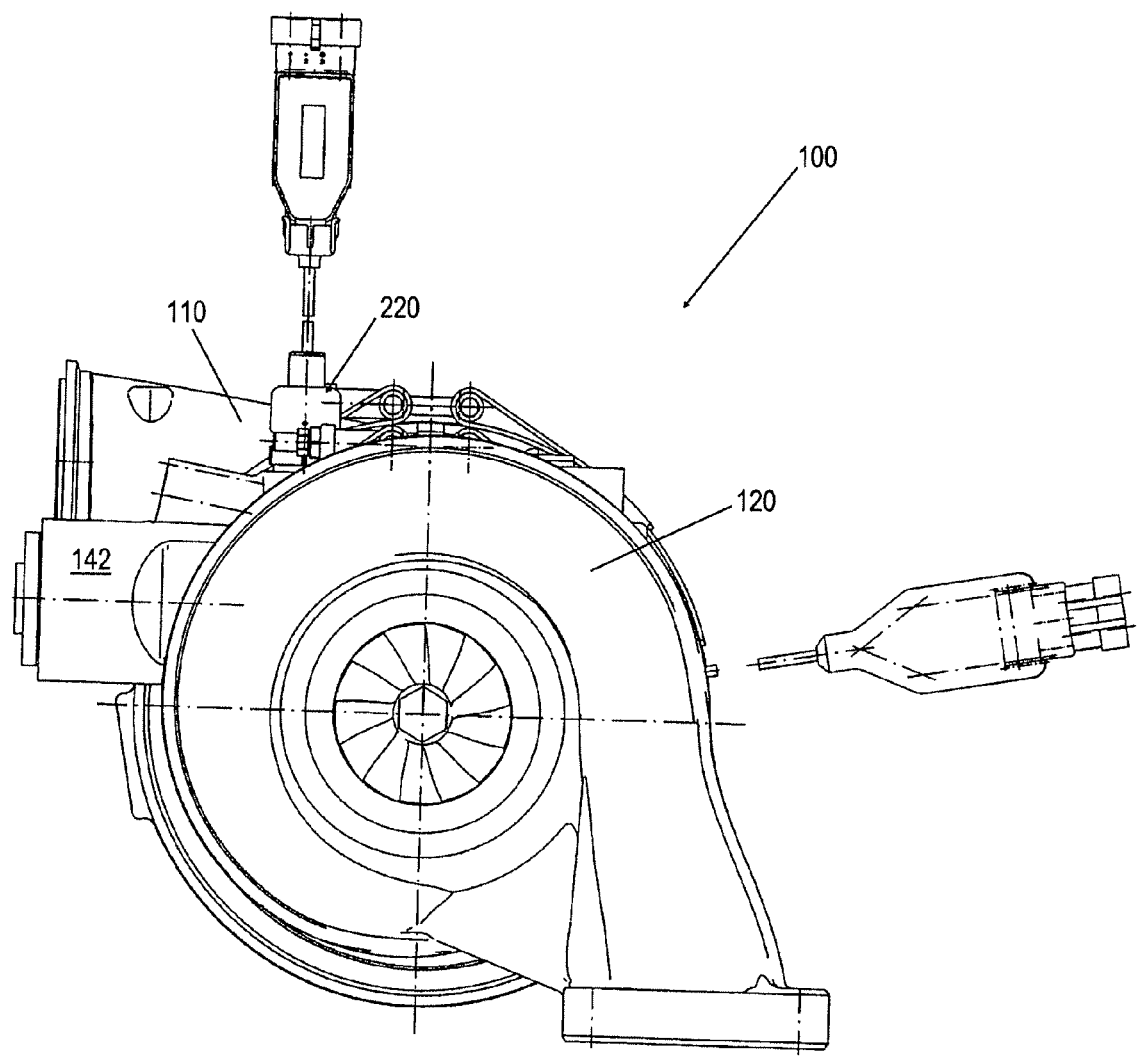
FIG. 2 is an end elevation of the turbocharger of FIG. 1 in the assembled state.
Figure 3:
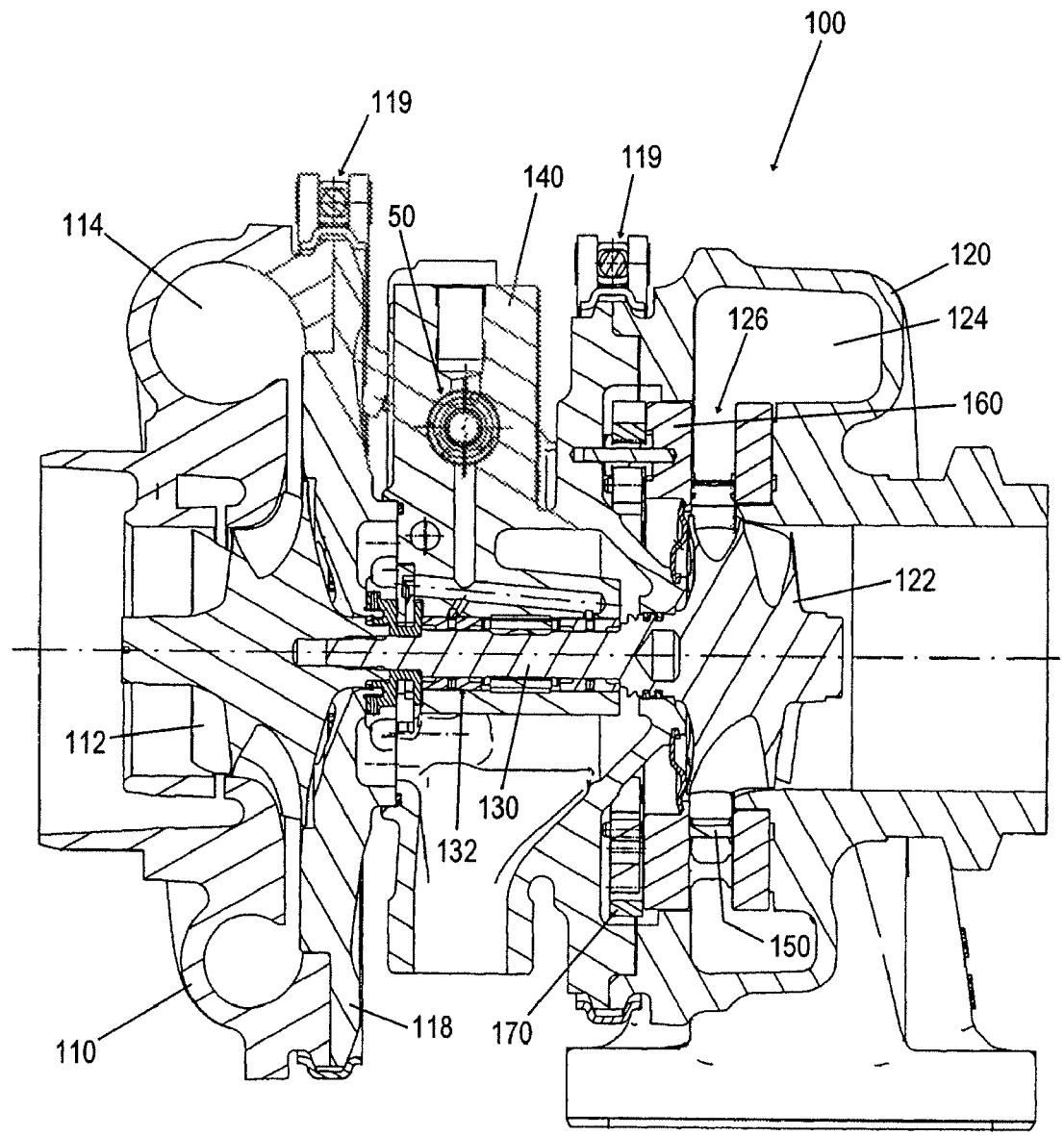
FIG. 3 is an axial cross-sectional view of the turbocharger of FIG. 1.
Figure 4:
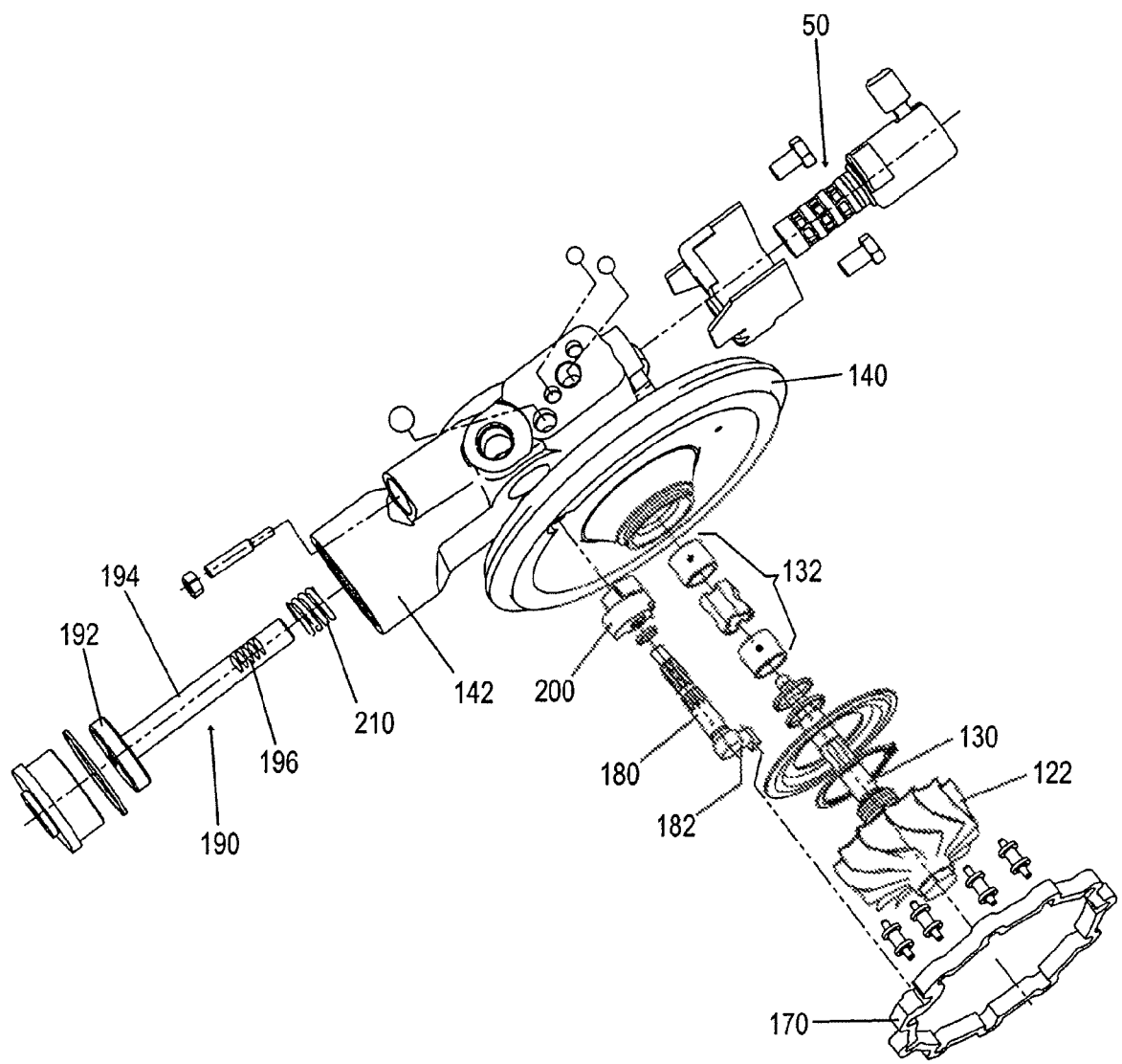
FIG. 4 is an exploded view of a portion of the turbocharger.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A turbocharger 100 in accordance with one embodiment of the invention is depicted in FIGS. 1-6. As best seen in the exploded view in FIG. 1 and the cross-sectional view in FIG. 3, the turbocharger comprises a compressor housing 110 that houses a compressor wheel 112. The compressor wheel is rotated to compress air entering axially through the compressor inlet, and the compressed air is discharged generally radially outwardly into a volute 114, from which the compressed air exits through a discharge conduit 116 for supply to the intake of an internal combustion engine (not shown). The turbocharger further comprises a turbine housing 120 that houses a turbine wheel 122. The turbine housing 120 defines a generally annular chamber 124 surrounding the turbine wheel for receiving exhaust gas from the internal combustion engine. The exhaust gas flows from the chamber 124 generally radially inwardly through a nozzle 126 to the turbine wheel 122, thereby rotating the turbine wheel. The turbine wheel 122 and compressor wheel 112 are affixed to opposite ends of a rotatable shaft 130. The shaft is supported by bearings 132 that are housed in a center housing 140 of the turbocharger, which is disposed between and connected to the compressor housing 110 and turbine housing 120.

The compressor portion of the turbocharger includes a back plate 118 that is secured to a flange of the compressor housing 110 by a suitable fastening arrangement such as a V-band clamp 119 or the like. The back plate 118 is fastened to the center housing 140 by suitable fasteners such as bolts 117. The turbine housing 120 is fastened by the center housing 140 by a suitable fastening arrangement such as a V-band clamp 119 or the like.

It should be noted that many of the detailed parts shown in FIG. 1, and their arrangements and functions, are essentially the same as the corresponding parts described in the earlier-incorporated U.S. Pat. No. 6,269,642. Accordingly, the present description will not repeat their description, since they are not particularly pertinent to the present invention.

The present invention mainly concerns an improvement to the hydraulic actuator that provides the actuation force for adjusting the setting angles of the turbine nozzle vanes 150. As in other similar turbochargers having variable vanes, the vanes 150 have vane axles or shafts 152 that are received through bearing apertures in a nozzle ring 160. Ends of the vane shafts 152 project out from the opposite side of the nozzle ring 160 and are affixed to vane arms 154 such that pivoting of each vane arm 154 about the pivot axis defined by the bearing aperture in the nozzle ring 160 causes the vane shaft 152, and hence the vane 150, to pivot. Each vane arm 154 engages a unison ring 170 that is rotatable about an axis substantially coinciding with the rotational axis of the turbocharger shaft 130. Thus, rotation of the unison ring in one direction or the other causes the vanes 150 to be pivoted in one direction or the other, thereby changing the setting angles of the vanes. The unison ring 170 is rotated by a crank shaft 180 that has an offset crank 182 attached to one end, the crank being engaged with the unison ring.

The motive force for rotating the crank shaft 180 is provided by a hydraulic actuator 190 contained in the center housing 140 and coupled by a mechanical linkage to the crank shaft 180. The hydraulic actuator is now described with primary reference to FIGS. 4 and 5. The center housing 140 casting includes an integral boss 142 that defines a bore 144. A piston 192 is disposed in the bore 144 and is reciprocatingly movable in the bore between a fully closed position (FIG. 6), a fully open position (FIG. 5), and intermediate positions therebetween. The piston 192 includes a piston rod 194 that extends through a further smaller-diameter bore 146 formed in the center housing. A rack gear 196 is formed on the piston rod 194. The rack gear is engaged by a pinion/cam 200 disposed in a cavity in the center housing. The pinion/cam 200 is affixed to the crank shaft 180 for the unison ring. The pinion/cam 200 defines gear teeth 202 that mesh with the teeth of the rack gear 196. Accordingly, reciprocating movement of the piston 192 is converted into rotational movement of the pinion/cam 200, and hence of the crank shaft 180. In this manner, the hydraulic actuator 190 is able to adjust the setting angles of the vanes.

Figure 5:
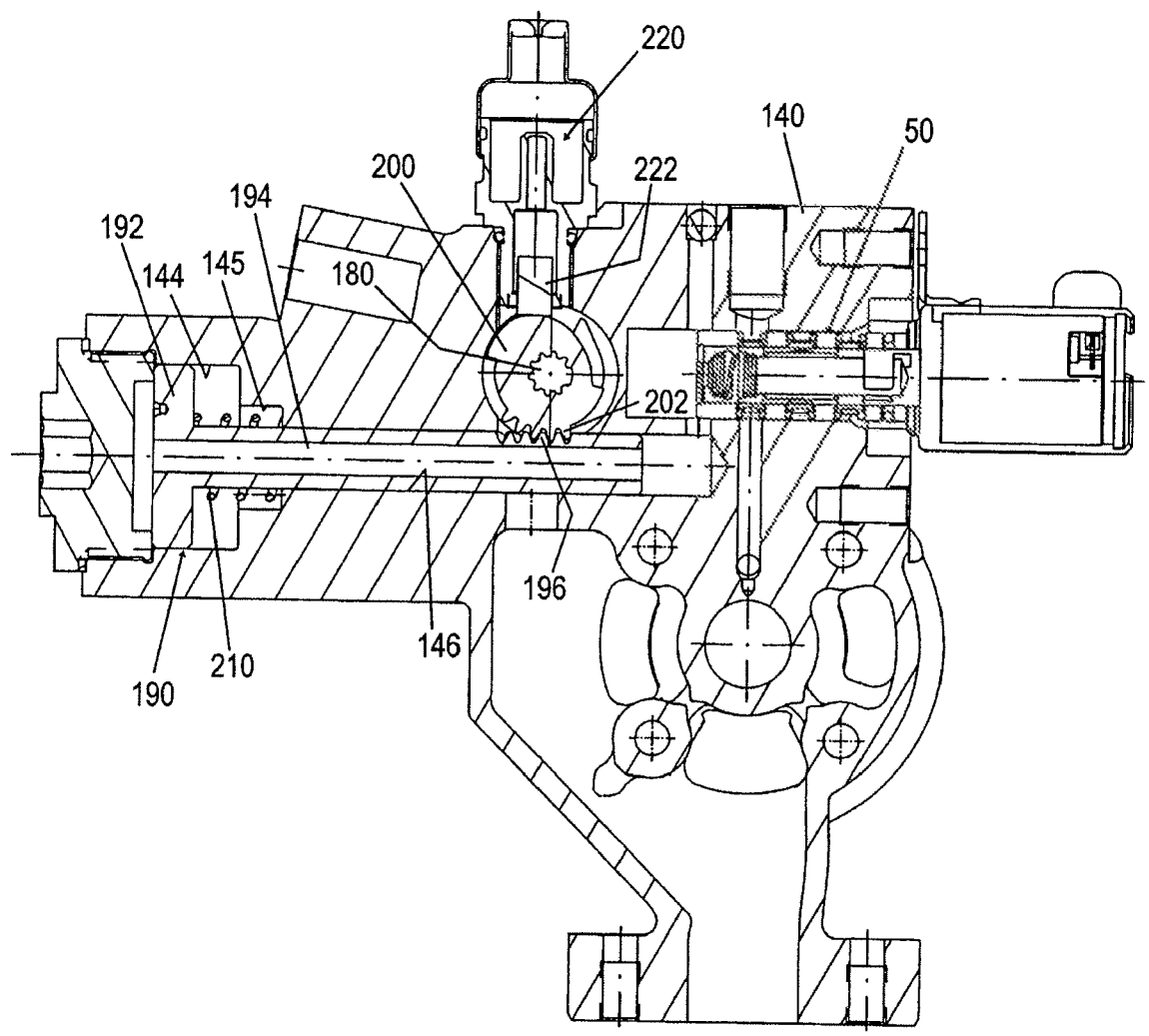
FIG. 5 is a transverse cross-sectional view through the center housing of the turbocharger of FIG. 2, showing the piston in a fully open position.
Figure 6:
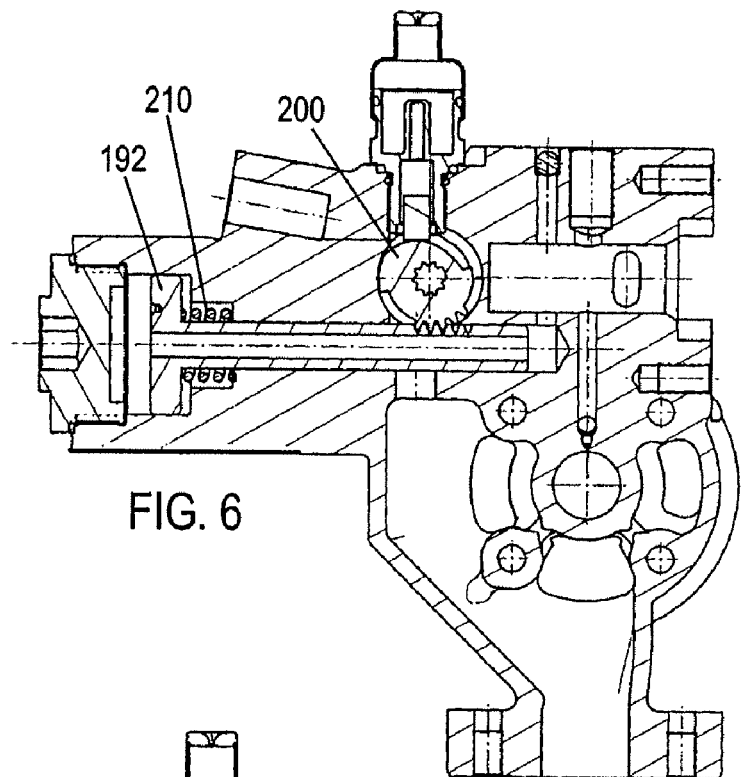
FIG. 6 is similar to FIG. 5, showing the piston in a fully closed position.

The hydraulic system includes hydraulic fluid passages connected to the bore 144, for supplying pressurized hydraulic fluid to the bore selectively on one side or an opposite side of the piston 192 for causing the piston to move toward the fully open position or toward the fully closed position, respectively. In this regard, the piston 192 and piston rod 194 are hollow, having a passage extending through the center for flow of hydraulic fluid. Pressurized hydraulic fluid is supplied into the portion of the bore 144 to the left (in FIG. 5) of the piston 192 by supplying the fluid into the smaller-diameter bore 146, the fluid then flowing through the center passage of the hollow piston rod and piston into the left-hand part of the bore 144. This causes the piston 192 to be moved by hydraulic force toward the closed position (toward the right in FIG. 5), which moves the vanes toward a more-closed position. Alternatively, hydraulic fluid is supplied into the right-hand part of the bore 144 via a hydraulic passage (not visible in FIG. 5) in order to move the piston 192 toward the open position (toward the left in FIG. 5), which moves the vanes toward a more-open position. The vanes are fully open when the piston is positioned as shown in FIG. 5, and are fully closed when the piston is positioned as shown in FIG. 6. The control of the hydraulic fluid flows to the piston bore is provided by a hydraulic servo control valve 50.

In accordance with the present invention, the hydraulic actuator 190 also includes a spring 210 arranged between the piston 192 and a surface of the bore 144. In the illustrated embodiment, the center housing 140 is formed to have a stepped bore comprising the bore 144, followed by an intermediate-diameter bore 145, then followed by the smaller-diameter bore 146, such that there is a shoulder defined between the intermediate and small bores, against which one end of the spring 210 bears. The spring is structured and arranged to continuously exert a spring force on the piston 192 toward the fully open position. The spring has a spring constant and a configuration that are selected to ensure that the spring force is sufficient to hold the piston in a predetermined position corresponding to a predetermined position of the vanes during a start-up of the engine when the hydraulic fluid is substantially unpressurized such that hydraulic fluid force on the piston is substantially zero.

In accordance with one embodiment of the invention, the predetermined position of the piston 192 is intermediate the fully open and fully closed positions, such that the vanes are in an intermediate position during an engine start. This is accomplished by selecting the spring so that the spring force in the predetermined position is substantially equal and opposite to a total gear train force that must be overcome in order to move the piston from the predetermined position farther toward the fully open position. As the piston moves from the fully closed position toward the fully open position, the spring force decreases generally linearly with piston position. At some intermediate position, the spring force will balance the mechanical load/force (total gear train force) in the train made up of the piston, pinion, crank shaft, unison ring, and vanes, such that the piston will remain in that intermediate position. By appropriate selection of the spring, the intermediate position at which the piston is held can be chosen.

In the illustrated embodiment, a significant component of the total gear train force is caused by a vane position sensor 220 for indicating vane position. The vane position sensor comprises the pinion/cam 200, whose outer periphery defines a cam profile of varying radius from the rotation axis of the pinion/cam, and a cam follower 222 arranged to engage the cam profile of the pinion/cam 200 such that rotation of the cam/pinion causes the cam follower to change position as it follows the cam profile. Thus, the position of the cam follower 222 is a function of the rotational position of the crank shaft 180 and hence is an indication of vane position. The cam follower 222 is urged against the pinion/cam by a follower spring (not shown) exerting a follower spring force on the cam follower. A force component caused by the follower spring force is transmitted through the pinion/cam 200 and rack gear 196 to the piston 192. This force component can be calculated based on the follower spring characteristics, its length in a given position of the cam follower 222, and the geometry of the pinion/cam and rack gear.

In accordance with the invention, in one embodiment, the spring 210 for the piston 192 is structured and arranged such that the spring force on the piston and the force component on the piston caused by the follower spring force substantially balance each other at an intermediate position of the piston between the fully open and fully closed positions. In the illustrated embodiment, the cam 200, cam follower 222, and follower spring are structured and arranged such that movement of the piston 192 from the fully closed position toward the fully open position causes the force component on the piston from the follower spring force to increase, while the spring force on the piston is caused to decrease. This is because as the piston moves from the fully closed position of FIG. 6 toward the fully open position, the profile of the cam 200 is such that the cam follower spring is being more and more compressed and hence the follower spring force is increasing. On the other hand, the spring force of the piston spring 210 decreases generally linearly as the piston moves toward the fully open position. At some intermediate position, the piston spring force will balance the force caused by the vane position sensor.

It may also be desirable to take into account other force components (e.g., friction) on the piston/rack/pinion/crank shaft/vane gear train when selecting the spring 210. Such additional force components would be additive with the force component caused by the vane position sensor, and thus a spring of somewhat higher spring force may be needed in order to achieve a certain desired vane position at engine start when hydraulic fluid pressure is substantially zero.

In addition to the advantage that the vanes are positioned in a more-optimal position at engine start, the turbocharger in accordance with the present development also can benefit overall turbocharger packaging by enabling the diameter of the piston 192 to be reduced. The sizing of the piston diameter tends to be driven by the need to prevent the vanes from becoming "stuck" in a too-closed position. In prior turbochargers, vane sticking was avoided by making the piston diameter larger so that the hydraulic force for a given oil pressure would be greater and would overcome the vane gear train force tending to hold the vanes in one position. In some cases, the vanes are also designed so that gas loads on the vanes are in a direction tending to close the vanes (the so-called "blow-to-close" design). Thus, to move the vanes toward the open position, the hydraulic actuator must overcome both the gas loads and the gear train force attributable to other causes. In accordance with the current development, however, the spring force assists the hydraulic force in opening the vanes, and hence oversizing of the piston is not necessary.

Figure 7:
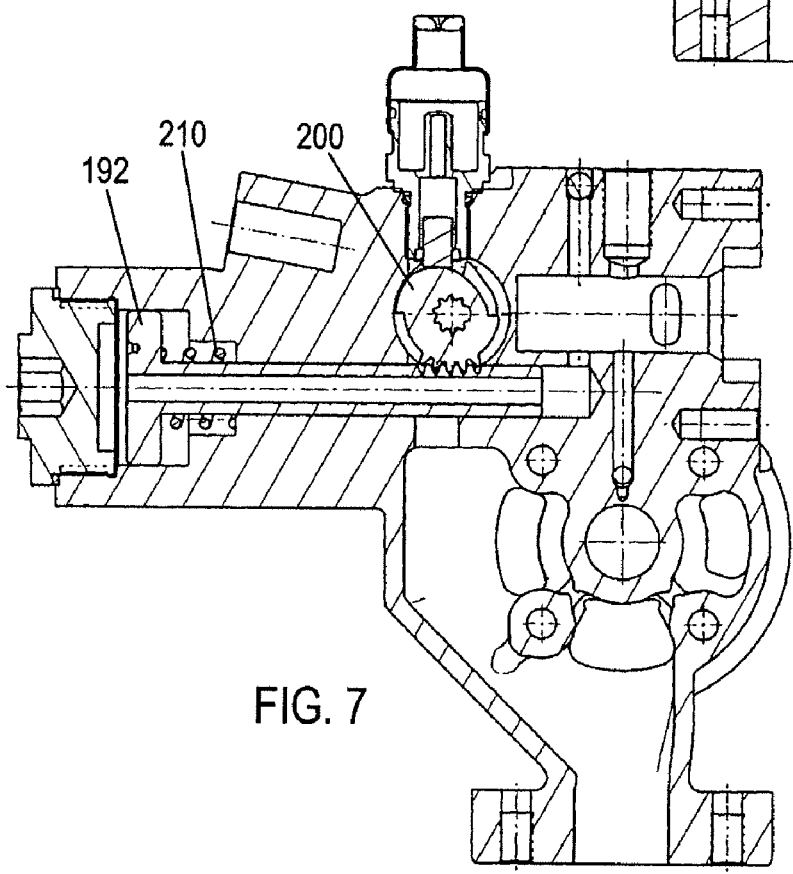
FIG. 7 is similar to FIGS. 5 and 6, showing the piston in a predetermined intermediate position in which the spring force and vane gear train force balance each other.

In accordance with some embodiments of the present invention, the intermediate position of the piston when hydraulic fluid pressure is zero is about 40 to 50 percent of the way from the fully open position to the fully closed position, as shown in FIG. 7 (which shows a 40.6% closed position). However, the invention is not limited to any particular intermediate position.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
 a compressor wheel connected to one end of a shaft and disposed in a compressor housing;
 a turbine wheel connected to an opposite end of the shaft and disposed in a turbine housing having a chamber for receiving exhaust gas from an engine, a nozzle leading from the chamber into the turbine wheel;
 a center housing connected between the compressor housing and the turbine housing;
 an array of vanes disposed in the nozzle, each vane being pivotable about a pivot axis of the vane, the vanes being connected to a rotatable unison ring such that rotation of the unison ring causes the vanes to be adjusted in setting angle;
 a rotatable crank shaft coupled to the unison ring such that rotational movement of the crank shaft causes rotation of the unison ring; and
 an actuation system coupled with the crank shaft and operable to rotate the crank shaft and hence the unison ring for adjusting setting angles of the vanes, the actuation system comprising:
 a piston contained in a bore formed in the center housing and reciprocatingly movable in the bore between a fully closed position, a fully open position, and intermediate positions therebetween, the piston including a piston rod;

a hydraulic system including hydraulic fluid passages connected to the bore, for supplying pressurized hydraulic fluid to the bore selectively on one side or an opposite side of the piston for causing the piston to move toward the fully open position or toward the fully closed position, respectively, movement of the piston toward the fully open position corresponding to pivoting of the vanes in a predetermined direction;

a mechanical linkage coupling the piston rod to the crank shaft and operable to convert reciprocating movement of the piston to rotational movement of the crank shaft; and a spring arranged between the piston and a surface of the bore, the spring being structured and arranged to continuously exert a spring force on the piston toward the fully open position of the piston;

wherein the spring has a spring constant and a configuration that are selected to ensure that the spring force is sufficient to hold the piston in a predetermined position corresponding to a predetermined position of the vanes during a start-up of the engine when the hydraulic fluid is substantially unpressurized such that hydraulic fluid force on the piston is substantially zero, and wherein the predetermined position of the piston is intermediate the fully open and fully closed positions, the spring force in the predetermined position being substantially equal and opposite to a total gear train force that must be overcome in order to move the piston from the predetermined position farther toward the fully open position.

2. The turbocharger of claim 1, wherein the mechanical linkage comprises a rack gear disposed on the piston rod and a pinion secured to the crank shaft, the pinion meshing with the rack gear to convert reciprocating movement of the piston to rotational movement of the pinion and hence the crank shaft.

3. A turbocharger, comprising:
a compressor wheel connected to one end of a shaft and disposed in a compressor housing;
a turbine wheel connected to an opposite end of the shaft and disposed in a turbine housing having a chamber for receiving exhaust gas from an engine, a nozzle leading from the chamber into the turbine wheel;
a center housing connected between the compressor housing and the turbine housing;
an array of vanes disposed in the nozzle, each vane being pivotable about a pivot axis of the vane, the vanes being connected to a rotatable unison ring such that rotation of the unison ring causes the vanes to be adjusted in setting angle:,
a rotatable crank shaft coupled to the unison ring such that rotational movement of the crank shaft causes rotation of the unison ring; and
an actuation system coupled with the crank shaft and operable to rotate the crank shaft and hence the unison ring for adjusting setting angles of the vanes, the actuation system comprising:

a piston contained in a bore formed in the center housing and reciprocatingly movable in the bore between a fully closed position, a fully open position, and intermediate positions therebetween, the piston including a piston rod;

a hydraulic system including hydraulic fluid passages connected to the bore, for supplying pressurized hydraulic fluid to the bore selectively on one side or an opposite side of the piston for causing the piston to move toward the fully open position or toward the fully closed position, respectively, movement of the piston toward the fully open position corresponding to pivoting of the vanes in a predetermined direction;

a mechanical linkage coupling the piston rod to the crank shaft, the mechanical linkage comprising a rack gear disposed on the piston rod and a pinion secured to the crank shaft, the pinion meshing with the rack gear to convert reciprocating movement of the piston to rotational movement of the pinion and hence the crank shaft;

a spring arranged between the piston and a surface of the bore, the spring being structured and arranged to continuously exert a spring force on the piston toward the fully open position of the piston; and a vane position sensor for indicating vane position, the vane position sensor comprising a cam affixed to the crank shaft and a cam follower arranged to engage the cam such that rotation of the crank shaft causes rotation of the cam, which in turn causes the cam follower to change position as it follows a cam profile of the cam, such that a position of the cam follower is a function of a rotational position of the cam and crank shaft and hence is an indication of vane position, the cam follower being urged against the cam by a follower spring exerting a follower spring force on the cam follower, and wherein a force component caused by the follower spring force is transmitted through the cam, pinion, and rack gear to the piston.

4. The turbocharger of claim 3, wherein the cam is an integral part of the pinion.

5. The turbocharger of claim 3, wherein the spring for the piston is structured and arranged such that the spring force on the piston and the force component on the piston caused by the follower spring force substantially balance each other at an intermediate position of the piston between the fully open and fully closed positions.

6. The turbocharger of claim 5, wherein the intermediate position is about 40 to 50 percent of the way from the fully open position to the fully closed position.

7. The turbocharger of claim 5, wherein the cam, cam follower, and follower spring are structured and arranged such that movement of the piston from the fully closed position toward the fully open position causes the force component on the piston from the follower spring force to increase, while the spring force on the piston is caused to decrease.

\* \* \* \* \*